United States Patent
Maiyuran et al.

(10) Patent No.: US 10,359,834 B2
(45) Date of Patent: *Jul. 23, 2019

(54) GRAPHICS PROCESSOR SUB-DOMAIN VOLTAGE REGULATION

(71) Applicant: Intel Corporation, Santa Clara, CA (US)

(72) Inventors: Subramaniam Maiyuran, Gold River, CA (US); Muhammad M. Khellah, Tigard, OR (US); James W. Tschanz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/409,366

(22) Filed: Jan. 18, 2017

(65) Prior Publication Data

US 2017/0322617 A1 Nov. 9, 2017

Related U.S. Application Data

(63) Continuation of application No. 14/134,598, filed on Dec. 19, 2013, now Pat. No. 9,563,263.

(51) Int. Cl.
*G06F 1/324* (2019.01)
*G06F 1/3234* (2019.01)
(Continued)

(52) U.S. Cl.
CPC ............ *G06F 1/3296* (2013.01); *G06F 1/324* (2013.01); *G06F 1/3243* (2013.01);
(Continued)

(58) Field of Classification Search
None
See application file for complete search history.

(56) References Cited

U.S. PATENT DOCUMENTS

2007/0008011 A1  1/2007  Thurston
2013/0173933 A1  7/2013  Ramani et al.
(Continued)

OTHER PUBLICATIONS

Damaraju et al., "A 22nm IA multi-CPU and GPU System-on-Chip," 2012 IEEE International Solid-State Circuits Conference, San Francisco, CA, 2012, pp. 56-57. doi: 10.1109/ISSCC.2012.6176876, URL: http://ieeexplore.ieee.org/stamp/stamp.jsp?tp=&arnumber=6176876&isnumber=6176863 Accessed Apr. 2, 2018.*
(Continued)

*Primary Examiner* — Kim Huynh
*Assistant Examiner* — Joshua Neveln
(74) *Attorney, Agent, or Firm* — Green, Howard & Mughal LLP

(57) ABSTRACT

Voltage regulation of processor sub-domains supplied by a same voltage domain power supply rail. Voltage to certain logic units within the voltage domain may be reduced relative to other logic units of the voltage domain, reducing idle time at high power. In an embodiment, a first voltage-regulated sub-domain includes at least one execution unit (EU) while a second voltage-regulated sub-domain includes at least one texture sampler to provide flexibility in setting the graphics core power-performance point beyond modulating active EU count through power domain (gating) control. In embodiments, a sub-domain voltage is regulated by an on-chip DLDO for fast voltage switching. Clock frequency and sub-domain voltage may be switched faster than the voltage of the voltage domain supply rail, permitting a more finely grained power management that can be responsive to EU workload demand.

18 Claims, 12 Drawing Sheets

(51) Int. Cl.
*G06F 1/3287* (2019.01)
*G06F 1/3296* (2019.01)

(52) U.S. Cl.
CPC .......... *G06F 1/3287* (2013.01); *Y02D 10/126* (2018.01); *Y02D 10/152* (2018.01); *Y02D 10/171* (2018.01); *Y02D 10/172* (2018.01)

(56) References Cited

U.S. PATENT DOCUMENTS

| 2013/0286026 A1 | 10/2013 | Kaburlasos et al. |
| 2014/0111173 A1 | 4/2014 | Lee |
| 2014/0298068 A1 | 10/2014 | Kosonocky et al. |

OTHER PUBLICATIONS

W. Kim et al, "System Level Analysis of Fast, Per-Core DVFS using On-Chip Switching Regulators" Proc. of the 14.sup.th International Symposium on High-Performance Computer Architecture, 2008, pp. 123-134. (Year: 2008).*

Final Office Action for U.S. Appl. No. 14/134,598 dated Jun. 13, 2016, 20 pages.
Issued Patent for Spanish Patent Application No. 201431706, dated May 6, 2016, Patent No. 2540651.
Non-Final Office Action for U.S. Appl. No. 14/134,598 dated Dec. 21, 2015, 20 pages.
Notice of Allowance for U.S. Appl. No. 14/134,598 dated Sep. 23, 2016, 7 pages.
Spanish Office Action for ES Application No. 201431706, dated Apr. 9, 2015.
Li, Peng, "Design Analysis of IC Power Delivery", Computer-Aided Design (ICCAD), 2012 IEEE/ACM International Conference IEEE May 11, 2012 pp. 664-666.
Okuma, Y. et al., "0.5-V Input Digital LDO with 98.7% Current Efficiency and 2.7 µA Quiescent Current in 65 nm CMOS", 978-2-4244-5760-1/10/; ©2010 IEEE; 4 pages.
Raychowdhury, A. et al., "A Fully-Digital Phase-Locked Low Dropout Regulator in 32 nm CMOS", 978-2-4244-5760-1/10/; ©2012 IEEE; 2 pages.

* cited by examiner

GRAPHICS PROCESSOR SUB-DOMAIN VOLTAGE REGULATION

CLAIM OF PRIORITY

This United States continuation patent application is related to, and claims priority to, U.S. patent application Ser. No. 14/134,598 entitled "GRAPHICS PROCESSOR SUB-DOMAIN VOLTAGE REGULATION," filed Dec. 19, 2013, the entire contents of which are incorporated herein by reference.

BACKGROUND

A graphics engine, graphics processing unit (GPU), or visual processing unit (VPU), is a specialized electronic circuit designed to rapidly manipulate and alter memory to accelerate the creation of images in a frame buffer typically intended for output to a display. GPUs may be found in embedded systems, mobile phones, tablets, notebook computers, high performance computation (HPC) servers, and game consoles. In addition to manipulating computer graphics in particular, a highly parallel architecture also enables a GPU to more generally perform processing of large blocks of data in parallel.

While many of the processing activities handled by a GPU are computationally intensive, there is an increasing need for energy efficient GPU architectures capable of scaling performance/watt not only between form factors (e.g., HPC server vs. a smartphone), but also dynamically within a particular form factor to handle different workloads at different times. For example, in an interactive usage application executing on a smartphone, such as opening a set of photos in response to a user action, a power-level of an embedded GPU may be ramped up (i.e., a graphics turbo mode) for a few milliseconds-seconds to provide a fast user experience. Such a turbo mode may dissipate significantly higher power during this short duration than over longer sustained workloads as generally limited by junction temperature. Depending on the thermal design power (TDP) for the given platform, GPU sustained power dissipation may be restricted to no more than 1-2 W in an exemplary tablet form factor, or a few hundred milliwatts in a smartphone form factor. Furthermore, limited battery resources of a mobile device may impose additional limitations on power dissipation to ensure that the device can function for the longest possible time.

Processor architectures and operational modes that facilitate power management in a manner that can enhance the power-performance point of the processor, improve user perception of performance, and offer greater operational flexibility are advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
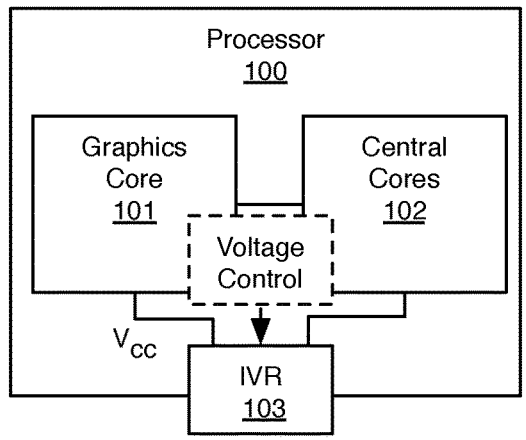
FIG. 1 is a functional block diagram illustrating a processor employing a graphics processor core, central processor core, and an integrated voltage regulator, in accordance with an embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth various implementations that may be manifested in architectures such system-on-a-chip (SoC) architectures or GPU architectures for example, implementation of the techniques and/or arrangements described herein are not restricted to particular architectures and/or computing systems and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, article, and method are described below for voltage regulation of processor sub-domains. FIG. 1 is a functional block diagram illustrating a (micro)processor 100, which in the exemplary embodiment is a SoC including both a graphics core 101 and central core(s) 102. While embodiments herein describe certain features in the context of an integrated graphics core, the same features are applicable to discrete GPU (dGPU) embodiments. Processor 100 employs an integrated voltage regulator (IVR) 103, which, depending on the embodiment may be integrated into a package of processor 100, and/or embedded directly on the processor die. IVR 103 may include for example a buck-boost converter stage, and/or a switched capacitor divider stage, etc. IVR 103 is coupled to graphics core 101 and central cores 102 to supply power to each over one or more power supply rails. One or more power supply rail to graphics core 101 for example, may be at a supply voltage, $V_{cc}$ that may be varied as a function of a supply voltage control signal originating from somewhere within processor 100 (e.g., graphics core 101 or central core 102, etc.) so that graphics core 101 may meet a particular power-performance point at a given time.

Figure 2A:
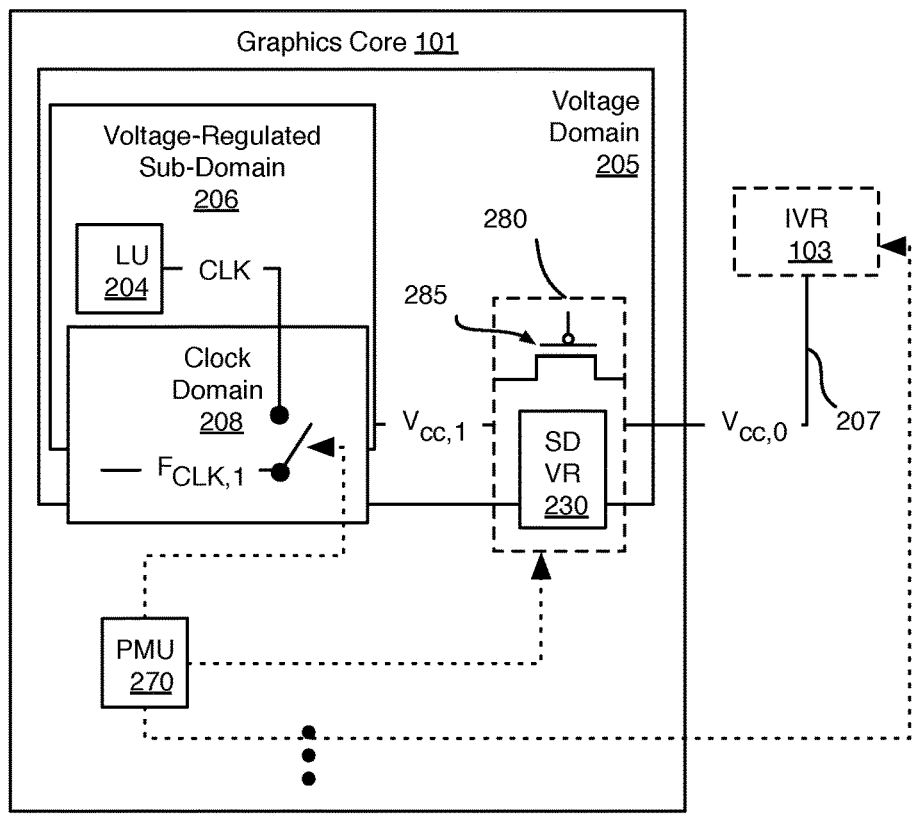
FIG. 2A is a functional block diagram illustrating a graphics processor power management architecture employing sub-domain voltage regulation, in accordance with an embodiment.

In embodiments, a processor core includes one or more voltage regulated sub-domain within a voltage domain. FIG. 2A is a functional block diagram further illustrating a graphics core power management architecture employing sub-domain voltage regulation, in accordance with an embodiment. As shown, graphics core 101 includes a voltage domain 205. A voltage domain is a grouping of functional logic circuit units (LU) that are operated at a same domain voltage (e.g., $V_{cc,0}$) as provided by a supply rail 207 of a first voltage regulator (e.g., IVR 103). Although only one voltage domain 205 is illustrated in FIG. 2A for the sake of clarity, graphics core 101 may have a number of voltage domains enabling different operating voltages across different functional logic units. Voltage-regulated sub-domain (VRSD) 206 is within voltage domain 205. A voltage-regulated sub-domain entails one or more logic unit that is reliant upon a supply voltage of the voltage domain with which it is associated, and is further operable at a voltage regulated to other than the domain voltage. More specifically, a voltage-regulated sub-domain entails one or more logic unit that can be controlled to at least one operating voltage below that of the voltage domain from which the sub-domain is powered. As shown in FIG. 2A, VRSD 206 is powered through a supply branch 280 off domain voltage supply rail 207. Supply branch 280 functionally includes a sub-domain voltage regulator (SDVR) 230 to regulate the sub-domain voltage $V_{cc,1}$ down to a suitable value below domain voltage $V_{cc,0}$ that will maintain LU 204 in an operational state. Implementations of SDVR 230 may vary, as is described in more detail below. SDVR 230 is notably down stream of IVR 103, and therefore relatively more local than IVR 103. SDVR 230 may be advantageously entirely integrated on the same die as graphics core 101, whereas IVR 103 may include at least external magnetics (e.g., integrated at a package level, or second chip, etc.).

In further embodiments, a sub-domain power supply branch includes power gate functionality. For example, in FIG. 2A supply branch 280 includes functionality of power gate 285 operable to gate the domain voltage $V_{cc,0}$ (e.g., $V_{cc,1}=0$ when power gate transistor 285 is turned off) and thereby place LU 204 into a non-operable or inactive "sleep" state. This power gate functionality serves to reduce leakage loss at any given domain voltage $V_{cc,0}$ when SDVR 230 is not regulating sub-domain voltage to some operational voltage. In addition to the voltage regulation and power gating modes, in further embodiments a sub-domain power supply branch is additionally configurable to bypass SDVR 230 in a "bypass" mode during which the sub-domain voltage $V_{cc,1}$ is equal to domain voltage $V_{cc,0}$, or very nearly so (e.g., $V_{cc,1} \sim V_{cc,0}$ when power gate transistor 285 is turned on). With the supply branch functionality illustrated in FIG. 2A, VRSD 206 is operable both in a "VR-mode" in which LU 204 is operable at a different (e.g., lower) regulated voltage than domain voltage $V_{cc,0}$, and in a "power domain-mode" where power to LU 204 is either gated, or unified with remainder of voltage domain 205. Notably, while the exemplary embodiment in FIG. 2A illustrates that VRSD 206 is further operable in the power domain mode, a voltage-regulated sub-domain need not have such gating/bypassing capability in addition to voltage regulation. Similarly, power domains need not be supplied through a sub-domain voltage regulator. Therefore, within a given voltage domain power domains may be provided independently from voltage-regulated sub-domains.

In embodiments, Dynamic Voltage and Frequency Scaling (DVFS) may be utilized to vary clock frequencies of one or more voltage domains (e.g., $V_{cc,0}$), and/or sub-domains (e.g., $V_{cc,1}$) within graphics core 101. Such algorithms may be implemented by a power management unit (PMU) 270 to meet performance demands of given workload at a reduced power level, for example by using power gating to reduce high leakage power during idle time of voltage domain 205, or by reducing high power idle time at the finer granular level of sub-domain 206. As shown by the dashed line in FIG. 2A, PMU 270 is communicatively coupled to both IVR 103 and SDVR 230, for example, as a controller of one or more of the domain voltage $V_{cc,0}$ and sub-domain voltage $V_{cc,1}$. Reducing domain voltage $V_{cc,0}$ (and a target clock frequency, $F_{clk,1}$ for a clock domain 208 within voltage domain 205) yields a cubic reduction in dynamic power $(C(V_{cc,0})^2F)$, related to the charging and discharging of logic transistors. An exponential reduction in leakage power ($I_{leak}$-$V_{cc,0}$), related to transistor gate and channel leakage, is also achieved. To maintain voltage domain 205 in an operational state however, domain voltage $V_{cc,0}$ is maintained above a minimum threshold below which the logic transistors become inactive in a sleep state. This minimum active domain voltage threshold is a function of die-to-die and w/in die device variations in addition to dynamic variations as a result of worst-case voltage droops, junction temperatures, and aging.

Power domain gating and sub-domain voltage regulation may further serve to reduce the power dissipated by a voltage domain operating at a given domain voltage either by turning off power to unused logic units of the domain executing a workload, or by reducing voltage to certain logic units within the voltage domain relative to other logic units within that voltage domain. Whereas a power domain or "sleep island" can be implemented with a number of power transistors, a voltage-regulated sub-domain further comprises a sub-domain voltage regulator. The power saving benefit achieved with the relatively more challenging implementation of a voltage-regulated sub-domain is dependent on the sub-domain architecture. The additional flexibility afforded by the possibility of mixing voltage-regulated sub-domains and power domains also makes sub-domain definition challenging.

In certain advantageous embodiments, a first voltage-regulated sub-domain includes at least one execution unit (EU), or "shader core." An EU generally has one or more single-instruction-multiple-data (SIMD) machine and a number of vector arithmetic logic units (ALU). For an exemplary embodiment with one or more EU in VRSD 206, the EU operating voltage(s) may be regulated down independently of the operating point for other logic units in voltage domain 205. This additional sub-domain-level voltage regulation may provide further flexibility in tailoring graphics core power-performance point beyond modulating active EU counts through power domain (gating) control. For example, rather than merely turning an EU on or off, an EU may be operated at a multiple different voltage-frequency (VF) pairings independent of other logic units in the voltage domain.

Figure 2B:
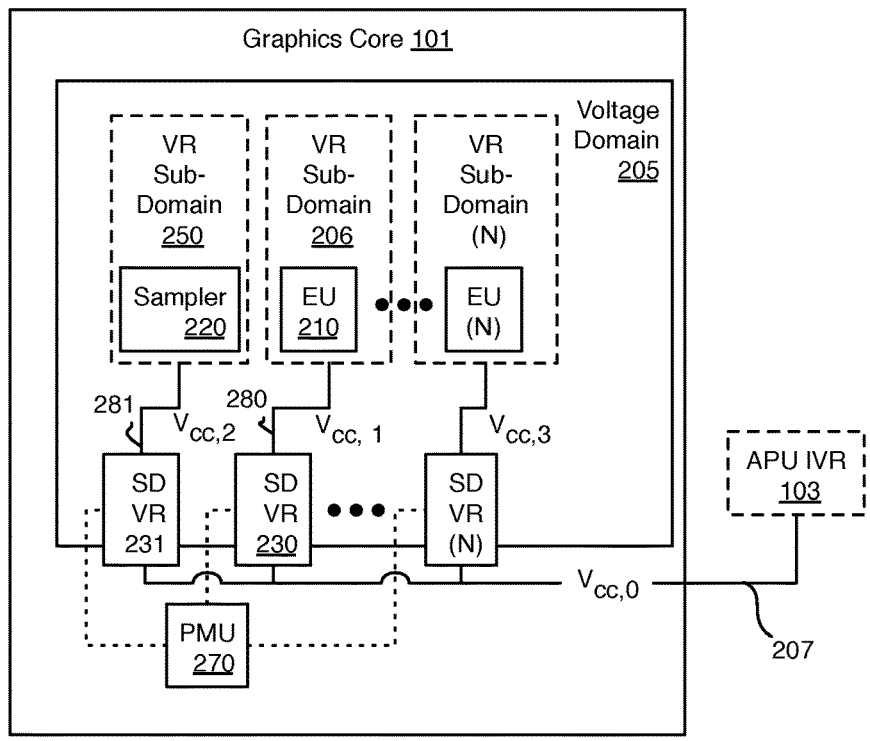
FIG. 2B is a functional block diagram illustrating a graphics processor power management architecture employing voltage regulation of multiple voltage sub-domains, in accordance with an embodiment.

In further embodiments, one voltage-regulated sub-domain includes at least one or more execution unit (EU), while another voltage-regulated sub-domain includes at least one or more texture sampler logic circuit unit. A sampler generally performs texture processing, for example mapping between a texel space and a pixel space with sampling and filtering functions designed to avoid frequency dependent artifacts, etc. FIG. 2B is a functional block diagram illustrating a graphics processor architecture employing sub-domain voltage regulation in accordance with such an embodiment. In this exemplary embodiment, within voltage domain 205 is VRSD 206 that includes at least one EU 210. VRSD 206 is coupled to rail 207 through supply branch 280, which is operable to convert domain voltage $V_{cc,0}$ down to a first sub-domain voltage $V_{cc,1}$ that maintains the EU logic circuitry operational in an active, low power state. Also within voltage domain 205 is VRSD 250 that includes at least one sampler 220. VRSD 250 is coupled to rail 207 through supply branch 281, which is operable to convert domain voltage $V_{cc,0}$ down to a second sub-domain voltage $V_{cc,2}$ that maintains the sampler logic circuitry operational in an active, low power state. Power supply branches 280, 281 are therefore each operable to provide a sub-domain voltage lower than the voltage at which the other sub-domain is operated. As further illustrated in FIG. 2B, there may be any number of similarly configured voltage-regulated sub-domains, for example partitioning various groupings of execution units. PMU 270 is coupled to each supply branch that includes a sub-domain voltage regulator or power gate, and is operable to set a regulated voltage target for each sub-domain and/or select between a voltage-regulation mode and a power-gating mode if supported by the supply branch circuitry.

Figure 3:
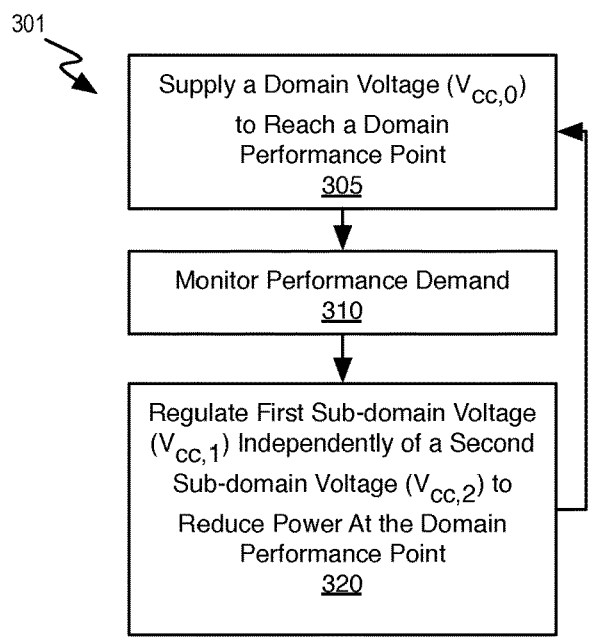
FIG. 3 is a flow diagram illustrating a power management method employing voltage regulation of multiple sub-domains, in accordance with an embodiment.

FIG. 3 is a flow diagram illustrating a power management method 301 of voltage regulating multiple sub-domains, in accordance with an embodiment. Although method 301 is specifically described below in the context of the architecture illustrated in FIG. 2B, it is more generally applicable to any architecture having at least two voltage-regulated sub-domains. Method 301 begins with supplying domain voltage $V_{cc,0}$ to a voltage domain. A pairing of the domain voltage $V_{cc,0}$ and a clock frequency specify a domain performance point achieved at operation 305. At operation 310, performance capability (e.g., junction temperature sensor measurements) and demand parameters (e.g., performance counters, etc.) are monitored, for example by a PMU. Such performance parameters may be associated with a graphics processor, and/or specifically associated with one or more voltage domain and/or voltage sub-domain of the graphics processor. At operation 320, a first sub-domain voltage $V_{cc,1}$ is regulated independently of a second sub-domain voltage $V_{cc,2}$ to reduce total power of the voltage domain. Regulation of $V_{cc,1}$ or $V_{cc,2}$ may be based on the performance monitoring operation 310 and in exemplary embodiments may maintain the domain performance point achieved at operation 305, but at lower power. For example, when a logic unit in the first sub-domain (e.g., EU 210) is a bottleneck in the workload being executed by the domain, the domain performance point might be maintained even if the logic unit(s) in the second sub-domain are switched to a lower clock rate and operated at a reduced sub-domain voltage $V_{cc,2}$ that has been regulated down to below domain voltage $V_{cc,0}$, and below sub-domain voltage $V_{cc,1}$.

Figure 4:
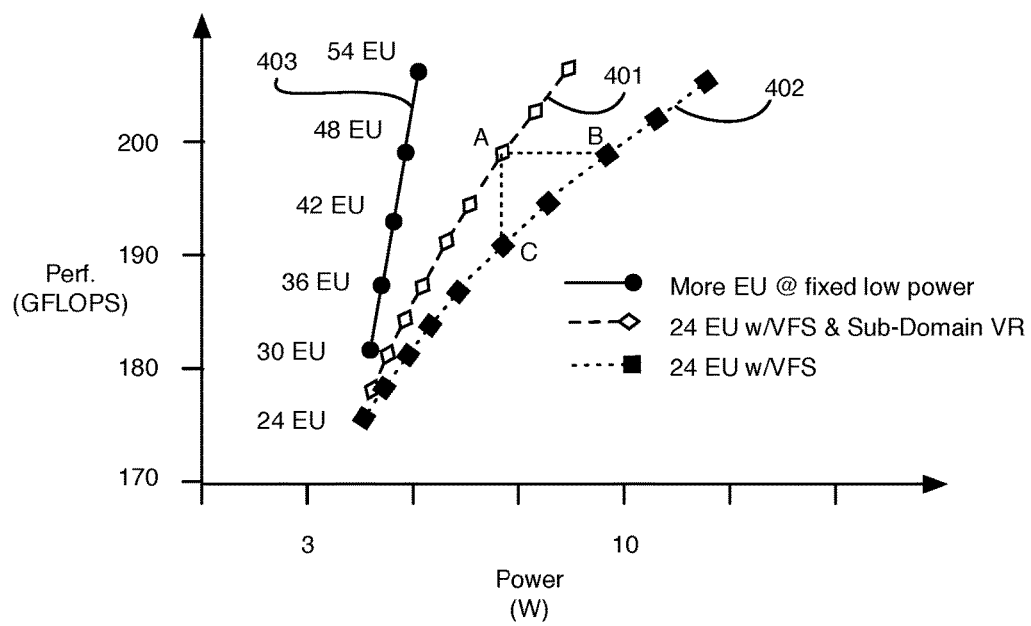
FIG. 4 is a power-performance graph illustrating performance of a graphics processor architecture employing sub-domain voltage regulation in accordance with an embodiment compared to two alternative processor architectures.

In embodiments, a voltage-regulated sub-domain including the sampler further includes other non-EU logic units. Exemplary non-EU logic units include, but are not limited to, rasterizers, caches, media pipeline, fixed functions, and memory interfaces. For such embodiments, the EU logic units may be either controlled within another sub-domain as described above, or controlled only at the voltage-domain level. FIG. 4 is a modeled power-performance comparison graph illustrating a performance line 401 of a graphics processor architecture employing sub-domain voltage regulation in accordance with an embodiment. Performance lines 402, 403 correspond to two alternative processor architectures provide in FIG. 4 for comparison. Performance line 401 corresponds to an exemplary architecture having non-EU processor logic (e.g., sampler, rasterizer, cache, memory interface, media fixed function blocks, etc.) in a VRSD controllable independently of a fixed number of active EUs (e.g., 24 EU). At the low power end of the performance line 401, the entire graphics processor is operating at the low voltage/low frequency point (e.g., $V_{cc,0}$=0.6V, $F_{clk,0}$=450 MHz). At point A on performance line 401, the EUs have been accelerated to operate at a high voltage/high frequency point (e.g., $V_{cc,0}$=0.9V, $F_{clk}$=900 MHz) while the other logic in the VRSD is regulated down to maintain the low voltage/low frequency point (e.g., $V_{cc,1}$=0.6V, $F_{clk}$=450 MHz).

Performance line 402 corresponds to an architecture where active EU count is again fixed (e.g., 24 EU), but there is no sub-domain voltage regulation. To increase performance, all the non-EU logic is operated at the same shared voltage-frequency point as the EU and so power increases more dramatically with increasing processor performance. For example, at the iso-performance line between points A and B (e.g., ~200 GFLOPS), the voltage-regulated sub-domain provides a 25-30% power savings. Alternatively, at least a 5% bump in performance is achieved for the iso-power line between points A and C. Performance line 403 represents an architecture where only active EU count is increased through power domain control with each active EU operated at a fixed low voltage and low clock frequency point (e.g., $V_{cc,0}$=0.6V, $F_{clk}$=450 MHz). While such an architecture is the most energy efficient of the three illustrated in FIG. 4, the efficiency gain is at the expense of an EU area penalty of up to 125% (e.g., (54−24)/24).

Figure 5:
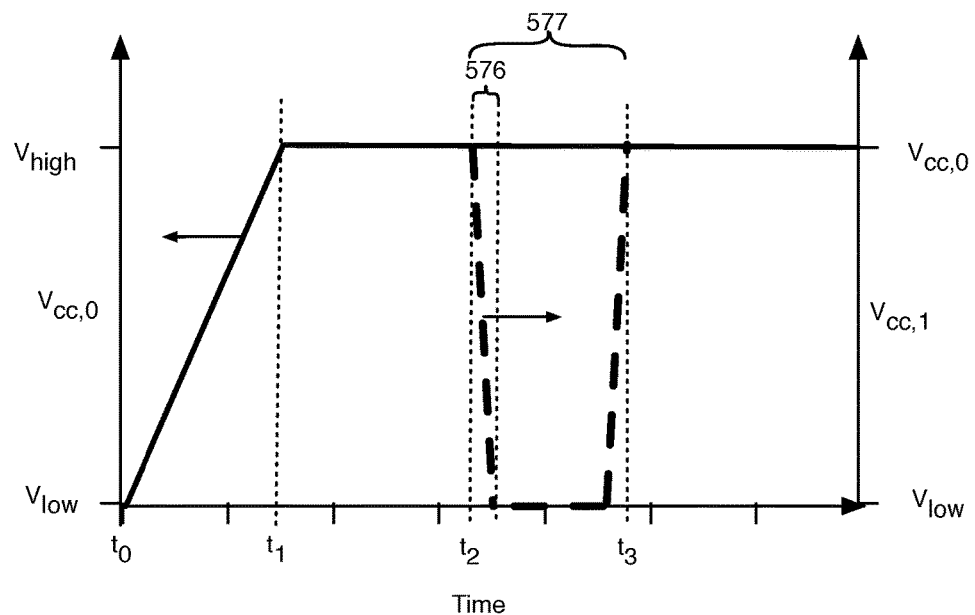
FIG. 5 is a graph of a regulated domain voltage and a regulated sub-domain voltage as a function of time, in accordance with an embodiment.

With FIG. 4 illustrating the benefit of "micro-turbo" functionality within a graphics processor afforded by the more granular voltage-regulated sub-domains, it is further noted the greater granularity is of more benefit as the rate at which the sub-domain voltage is modulated increases. This is because the dynamics of the workload become increasingly difficult to predict for the more finely grained sub-domain and the time period over which one sub-domain limits the performance of a domain may be of smaller duration. For example, an EU-limited workload execution condition may be present for time windows on the order of hundreds of nanoseconds to microseconds. In advantageous embodiments therefore, a sub-domain voltage regulator is further operable to vary a sub-domain voltage between the domain voltage and a reduced voltage at a rate greater than the rate at which the voltage domain may be modulated. FIG. 5 is a graph of a domain voltage and a regulated sub-domain voltage as a function of time, in accordance with one such embodiment. Beginning at time $t_0$, domain voltage $V_{cc,0}$ increases from $V_{low}$ (e.g., 0.6V) to $V_{high}$ (e.g., 0.9V) at a relatively slow rate until leveling off at time $t_1$. The increase in $V_{cc,0}$ may be triggered for example to meet an initial increased performance demand for a given workload. This change in domain voltage $V_{cc,0}$ may be implemented for example by switching between external rails (e.g., separate rails from IVR 103 in FIG. 1), or by raising the external rail voltage (e.g., IVR 103 outputting a higher $V_{cc,0}$ voltage on rail 207). In either case, milliseconds may be required for this voltage change, which may be too slow to provide adequate control for EU-level granularity. At time $t_2$, a sub-domain voltage regulator (e.g., SDVR 230) is controlled to convert the domain voltage down to output a reduced sub-domain voltage $V_{cc,1}$, for example back down to $V_{low}$. The decrease in $V_{cc,1}$ may be triggered for example based on a decreased performance demand on the EU. The change in sub-domain voltage $V_{cc,1}$ is much faster, occurring over a time window 576 that is less than a few microseconds, advantageously less than a few hundreds of nanoseconds, and more advantageously no more than a few tens of nanoseconds. At time $t_3$, sub-domain voltage $V_{cc,1}$ is returned from $V_{low}$ back to domain voltage $V_{cc,0}$, for example in response to an increased EU demand. With fast sub-domain voltage switching, a sub-domain switching cycle 577 over which EU operating voltage is stepped down and back need be only slightly greater than the switching time, allowing for relatively less latency than is associated with domain voltage $V_{cc,0}$.

In an embodiment, sub-domain voltage regulation is implemented with a digital low-dropout (DLDO) regulator.

Figure 6A:
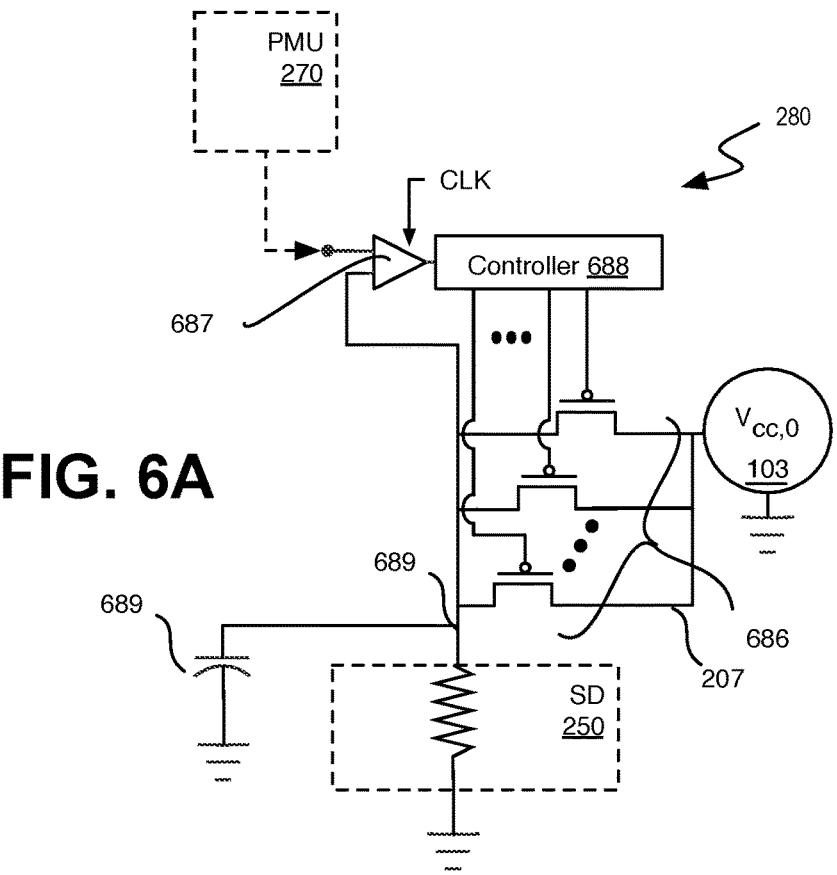
FIG. 6A is a circuit schematic illustrating sub-domain voltage regulation with an integrated DLDO regulator, in accordance with an embodiment.

The power savings achieved through sub-domain voltage regulation has a linear, rather than quadratic, dependence on voltage due to power loss attributable to the linear drop out through the regulator. Low dropout is therefore advantageous in addition to high voltage switching frequency. FIG. 6A is a circuit schematic illustrating a sub-domain supply branch employing a DLDO 280, in accordance with an embodiment. An output of PMU 270 is coupled to an input of DLDO 280, and more specifically to an input of a comparator 687, as a voltage reference specifying a sub-domain voltage target. Comparator 687 may be any digital comparator, such as, but not limited to a flash or direct conversion ADC capable of high sample rates and low operating voltage (e.g., 0.6V). Comparator 687 is advantageously a capacitive design clocked by a clock signal input into comparator 687 that may be of any available rate (e.g., 1-100 MHz) with lower rates consuming less power but modulating the sub-domain voltage less rapidly. Output of comparator 687 is coupled to an input of switch array controller 688. Switch array controller 688 may be, for example, based on a shift register with parallel outputs, each output corresponding to a bit of an n-bit shift register and coupled to a gate of a power transistor (FET) of switch array 686. In the exemplary embodiment illustrated in FIG. 6A, switch array 686 includes a plurality of PMOS power transistors with their source and drains coupled in parallel across the power supply rail 207 and DLDO output node 689. Output node 689 is further coupled to an input of comparator 687 for voltage sense feedback. Sub-domain 250 is further coupled to output node 689 as the load. As an option, a decoupling capacitor 689 of a value sufficiently small to be integrated on chip may be further coupled to output node 689.

Figure 6B:
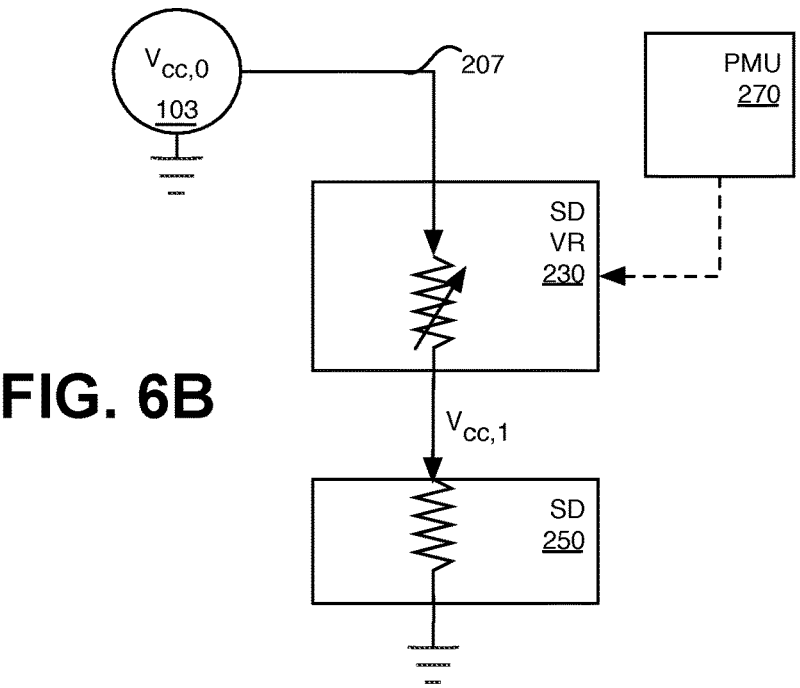
FIG. 6B is a schematic illustrating a model of a sub-domain voltage regulation architecture employing an integrated DLDO regulator, in accordance with an embodiment.

As shown in FIG. 6A, DLDO 280 includes many parallel PMOS power transistor legs, any number of which may be turned on or off. As further illustrated in FIG. 6B, SDVR 230 incorporating DLDO 280 may be modeled as a variable resistance between input power rail 207 at domain voltage $V_{cc,0}$ and an output at sub-domain voltage $V_{cc,1}$. The resistance value is dependent on the number of DLDO transistor legs that are enabled based on the voltage control signal output by PMU 270. In an advantageous embodiment where a sub-domain supply branch is further operable in a power gating mode, the parallel power FET legs of DLDO 280 may be all disabled to isolate sub-domain 250 (e.g., to place sampler 220 in sleep mode, etc.), or may be all enabled to operatively short sub-domain voltage $V_{cc,1}$ to domain voltage $V_{cc,0}$ (e.g., to bypass power gate and regulation, etc.).

Figure 6C:
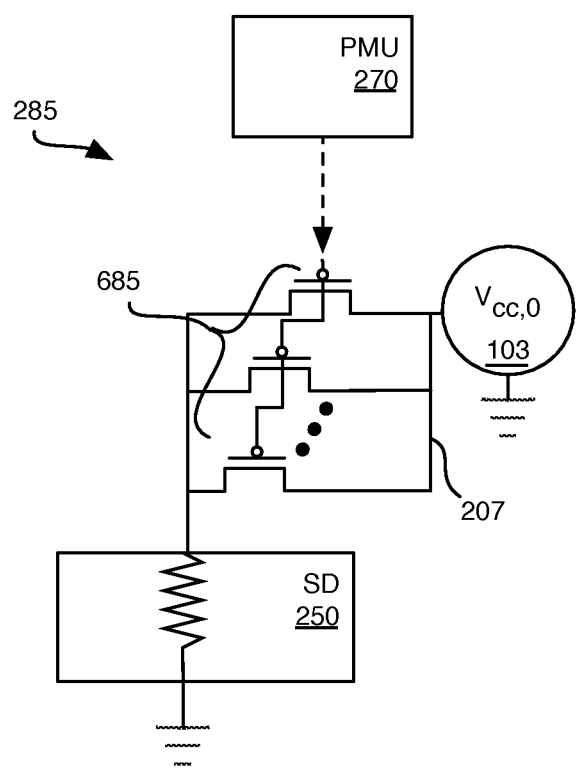
FIG. 6C is a circuit schematic illustrating a sub-domain power gating mode, in accordance with an embodiment.

Notably, chip area overhead for implementing sub-domain voltage regulation with a DLDO of the type illustrated in FIG. 6A is primarily attributable to the voltage sensor (e.g., comparator 687) and switch array controller 688, which are each very compact. Switch array 686 may be nominally overloaded onto a switch array configured for gating of a power domain. For example, FIG. 6C is a circuit schematic illustrating a physical implementation of the functional power gate 285 introduced in FIG. 2A, in accordance with an embodiment. As shown, the (PMOS) transistors 685 are to be all turned "on" during an active mode and all turned "off" during a sleep mode. This multi-gate power gate implementation beneficially distributes the current from the power gate device to all portions of the power domain. In a conventional power gate architecture, one signal is typically used in a daisy chain fashion to turn the transistors 685 all on or all off, simplifying the overhead associated with implementing a power domain (e.g., in terms of routing resources). Daisy-chaining the (turn-on of) power switches reduces voltage droop on the ungated power rail 207 during a wake-up of SD 250. This same functionality however can be achieved via switch array controller 688 in the DLDLO 280 illustrated in FIG. 6A. Hence, any power domains desired within a voltage domain can be overloaded with the voltage regulation function to enable the sub-domain voltage regulation mode of one or more embodiments described herein.

Figure 7A:
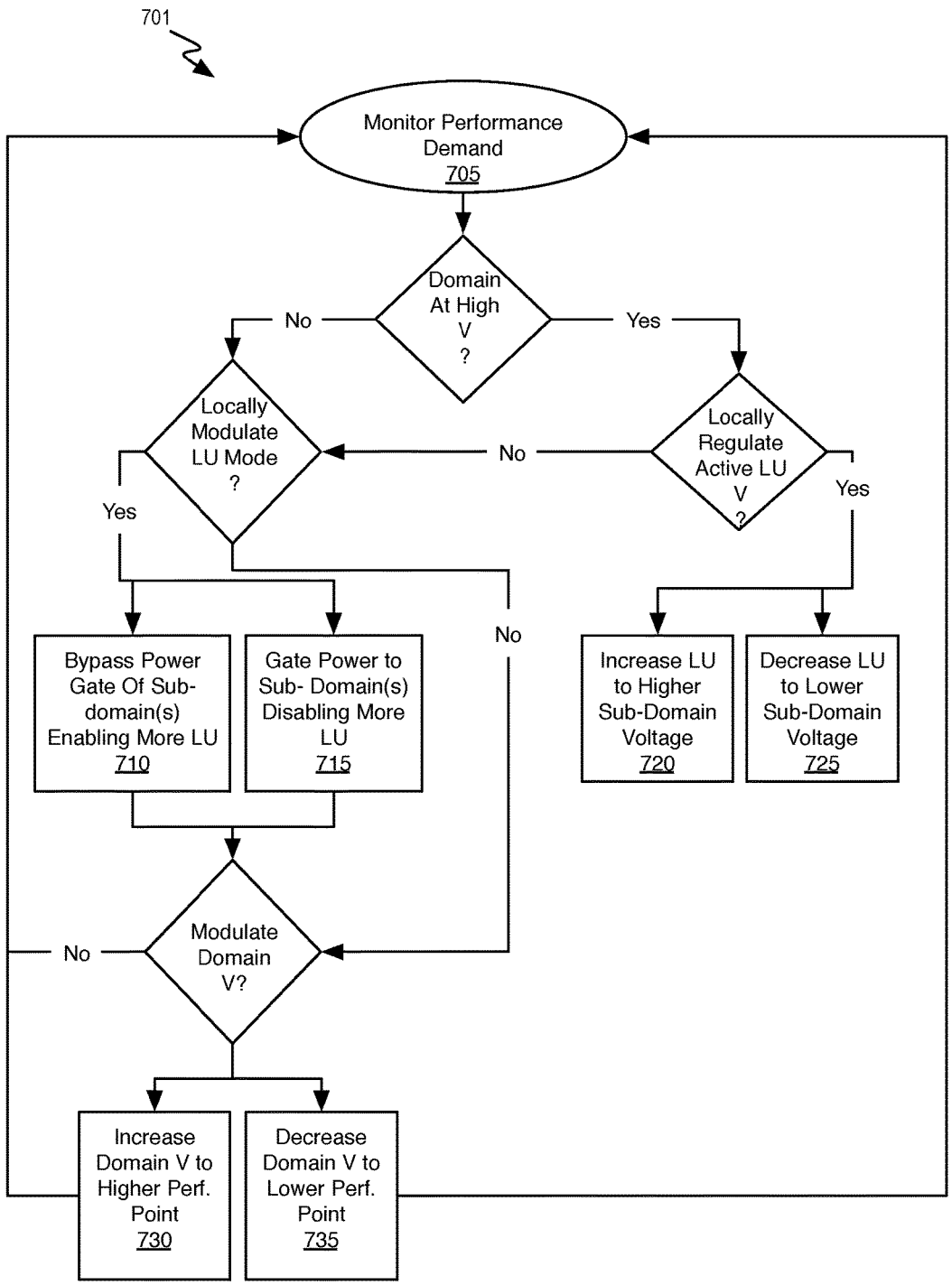
FIG. 7A is a flow diagram illustrating a processor power management method employing both power gating and voltage regulation modes, in accordance with an embodiment.

FIG. 7A is a flow diagram illustrating a processor power management method 701 employing both power gating and voltage regulation modes, in accordance with an embodiment. Method 701 is an exemplary embodiment of the more general method 301 illustrated in FIG. 3. Referring to FIG. 7, performance of, and demand on, the processor, or a domain of the processor, or a sub-domain of a processor is monitored at operation 705. Embodiments are not limited with respect to the type of monitoring that may be performed. Method 701 may maintain existing power levels, or depending on the domain voltage, method 701 may proceed to either locally switch the logic units between voltage regulation, power-gating, or bypass mode, or proceed to locally regulate the operating voltage of active logic within a voltage sub-domain. Where domain voltage $V_{cc,0}$ is already at a lowest operating point ($V_{low}$) and all logic units in the domain are in a power-saving, but operational mode, the logic unit count may be further modulated through either bypassing power gates to enable additional logic units at operation 710, or by gating power to disable additional logic units at operation 715. Alternatively, where domain voltage $V_{cc,0}$ is at a higher operating point ($V_{high}$), and at least some of the logic units in the domain are operating at $V_{cc,0}$, the logic unit count may be locally modulated through the bypass or gating operations 710, 715, or sub-domain voltage regulation may be performed at operation 720, and/or operation 725.

At operation 720, a sub-domain in VR mode may be brought up to a higher operating voltage if the domain voltage $V_{cc,0}$ provides sufficient headroom above the minimum operative voltage threshold. If not, increasing sub-domain voltage $V_{cc,1}$ at operation 720 may be equivalent to bypassing voltage regulation such that $V_{cc,1}=V_{cc,0}$. At operation 725, a sub-domain may be brought down to an operating voltage below domain voltage $V_{cc,0}$ if there is sufficient headroom above the minimum operational voltage threshold. For example, decreasing sub-domain voltage $V_{cc,1}$ at operation 725 may switch a sub-domain from bypass mode to VR mode where $V_{cc,1}$ is brought from $V_{high}$, down to $V_{low}$. Independently, the domain voltage may be brought either up to a higher domain performance point at operation 730, or down to a lower domain performance point at operation 735. Method 701 then loops back to performance monitoring operation 705.

Figure 7B:
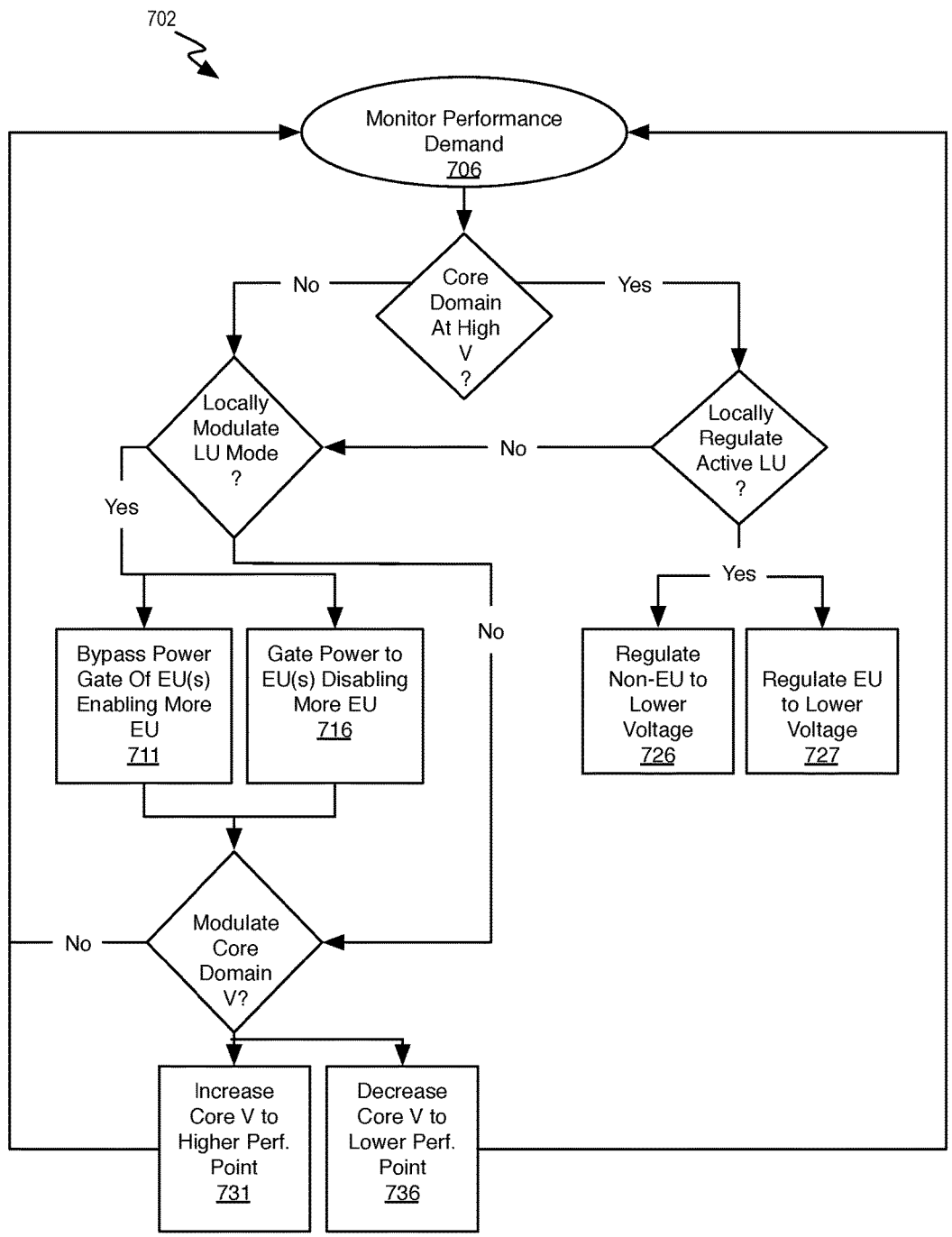
FIG. 7B is a flow diagram illustrating a graphics processor power management method employing both power gating and voltage regulation modes within the processor core, in accordance with an embodiment.
Figure 8:
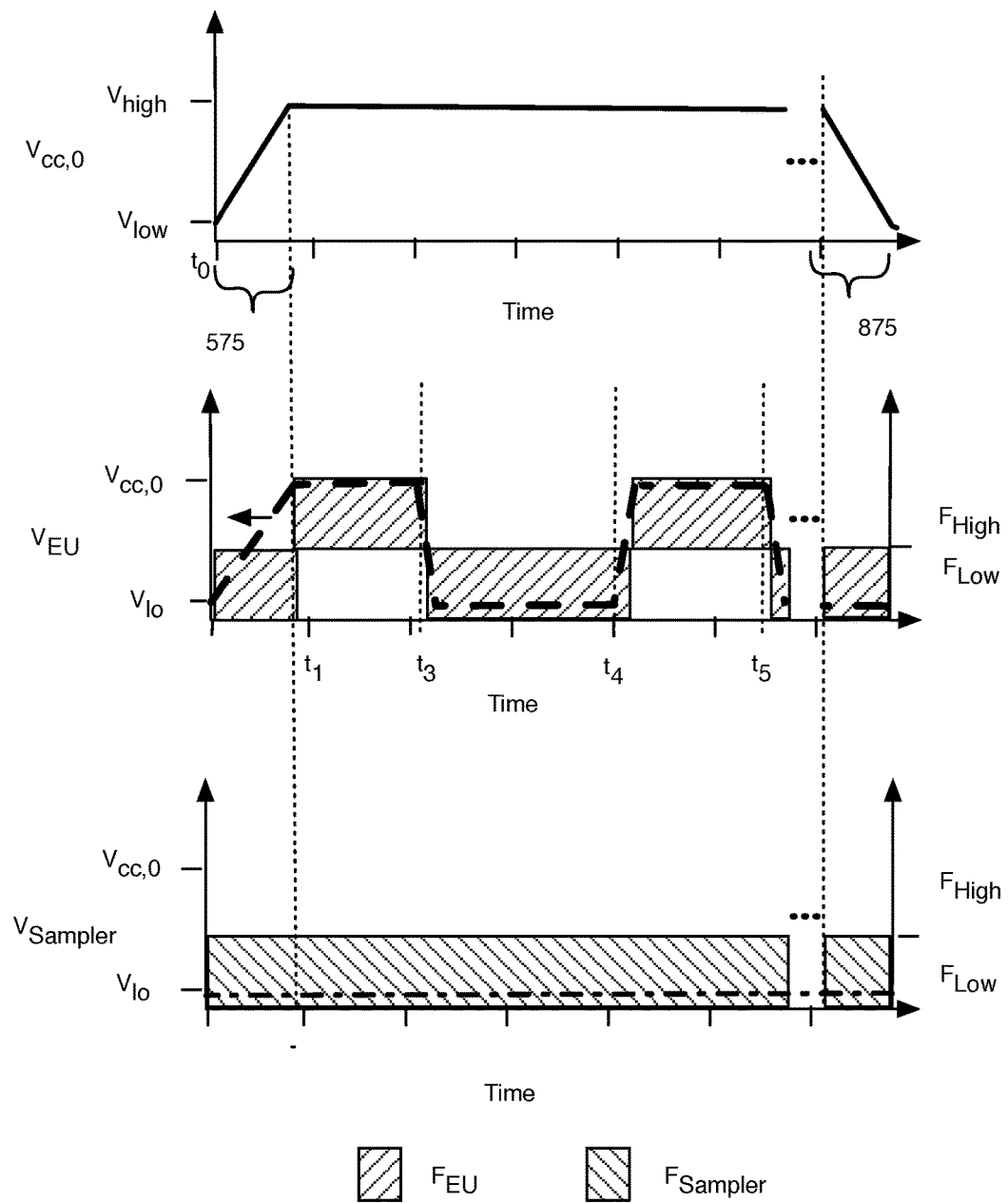
FIG. 8 graphs a graphics core domain voltage and core sub-domain voltages as the method illustrated in FIG. 7B is performed in accordance with an embodiment.

FIG. 7B is a flow diagram illustrating a graphics processor power management method 702 employing both power gating and voltage regulation modes within a graphics processor core with the specific architecture that was illustrated in FIG. 2B, in accordance with an embodiment. Method 702 is one example of the more general method 701. FIG. 8 graphs a graphics core domain voltage and sub-domain voltages as the method 702 is performed in accordance with an embodiment. As shown in FIG. 8, at time to domain voltage $V_{cc,0}$ is at $V_{low}$ (e.g., 0.6V) and EU(s) in the first sub-domain, and sampler(s) in the second sub-domain are all at a low clock frequency ($F_{EU}=F_{sampler}=F_{low}$). Method 702 (FIG. 7B) begins with monitoring performance demand at operation 706 and a first bottlenecking of workflow execution at the EU(s) is detected. In response to the detection, method 702 proceeds to operation 731 where domain voltage $V_{cc,0}$ is ramped up (relatively slowly) over the time window 575 to $V_{high}$ (e.g., 0.9V). At the higher $V_{cc,0}$ the active EU(s) have their operating voltage $V_{cc,1}$ equal to $V_{cc,0}$ and are brought to a higher clock rate $F_{high}$, which may be provided for example by a separate EU phase lock-loop (PLL) or a 2× clock.

Method 702 continues with operation 726 where the non-EU sub-domain including one or more sampler is brought from bypass mode into voltage regulation mode with $V_{cc,2}$ regulated down from $V_{cc,0}$ to keep the sampler at $V_{low}$. The sampler is likewise maintained at the low clock frequency $F_{low}$, as depicted in FIG. 8. At time $t_1$ therefore, the EU of the unregulated sub-domain (e.g., sub-domain 250 in FIG. 2B) is in the micro-turbo mode with the sampler in the regulated domain (e.g., sub-domain 251 in FIG. 2B) operating at lower power. Method 702 continues to monitor performance demand at operation 706 and an end of the EU bottlenecking period is detected at $t_3$. Domain voltage $V_{cc,0}$ however remains at $V_{high}$ according to the domain voltage switching time. With the relatively faster voltage switching afforded by the sub-domain regulator, sub-domain voltage latency can be significantly less than that of the domain. Method 702 proceeds to operation 727 where the EU sub-domain is brought into VR mode with $V_{cc,2}$ regulated down to place the EU back at $V_{low}$. Along with the sub-domain regulation, the EU clock frequency is switched back to $F_{low}$, as also depicted in FIG. 8. At this point, two separate sub-domains, one for the EU(s) and one for the sampler(s) are in regulation mode keeping any number of other logic units operating in a low power mode while the supply rail common to both sub-domains is at $V_{high}$.

Continuing with method 702, upon detecting another EU bottlenecking, the EU micro-turbo mode is activated again by a sub-domain voltage controller responsive to a performance parameter associated with relevant sub-domain. Bypass operation 711 is executed, which terminates voltage regulation at time $t_4$, returning $V_{cc,2}$ to $V_{high}$. The EU sub-domain then switches clocks to $F_{high}$. At time $t_5$, the EU domain returns to regulation mode and low clock frequency. As such, the EU sub-domain voltage is cycled between domain voltage $V_{high}$ and $V_{low}$ to modulate the performance of the EU independently from the sampler and any other non-EU logic units. After meeting the latency requirement for the domain voltage, method 702 continues to operation 736 where domain voltage $V_{cc,0}$ is reduced back to $V_{low}$ for greater power savings.

FIGS. 9A, 9B, 9C, and 9D are functional block diagrams of graphics processor cores illustrating demarcation of processor core sub-domains, in accordance with embodiments. Noting power savings available through sub-domain voltage regulation is a function of the characteristics of the logic units that are included within different sub-domains, FIGS. 9A-9D more specifically illustrate domains for an exemplary graphics processor architecture in which a basic scaling unit is a "subslice." Referring first to FIG. 9A, in architecture 901 a subslice 907 includes is sampler 220 and a plurality of EUs (e.g., EU 210, and EU 911-917). A slice common 930 external to subslice 907 includes at least one or more rasterizer. Cache 935 (e.g., L3 cache), 3D pipeline fixed-function logic circuitry 922, media pipeline fixed-function logic circuitry 527 and memory I/O 926 are also external to subslice 907. In the exemplary embodiment illustrated in FIG. 9A, graphics core 101 is divided into two voltage-regulated subdomains. Subslice 907 includes both voltage domains such that sampler 220 is in a domain separate from all the EUs 210, 911-917. Hence architecture 901 is a more specific implementation of the architecture illustrated in FIG. 2B. As further illustrated in FIG. 9A, the first domain including sampler 220 further includes slice common 930, cache 935, 3D fixed-function logic circuitry 922, media fixed-function logic circuitry 527, and memory I/O 926. In this manner, a significant fraction of processor core 101 may be regulated down to a low sub-domain voltage while only EUs are maintained at a higher performance point.

Figure 9A:
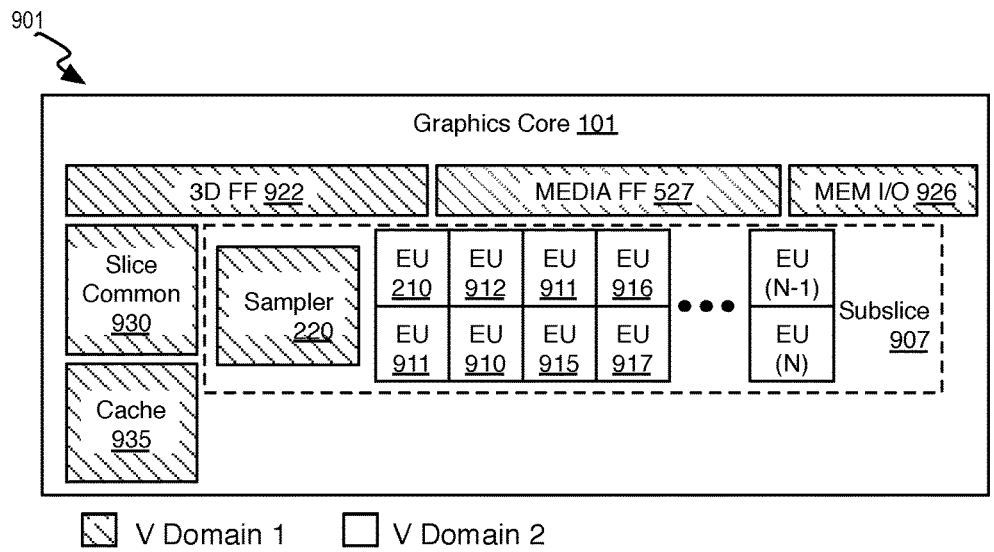
FIGS. 9A, 9B, 9C, and 9D are functional block diagrams of graphics processor cores illustrating demarcation of processor core sub-domains, in accordance with embodiments.
Figure 9B:
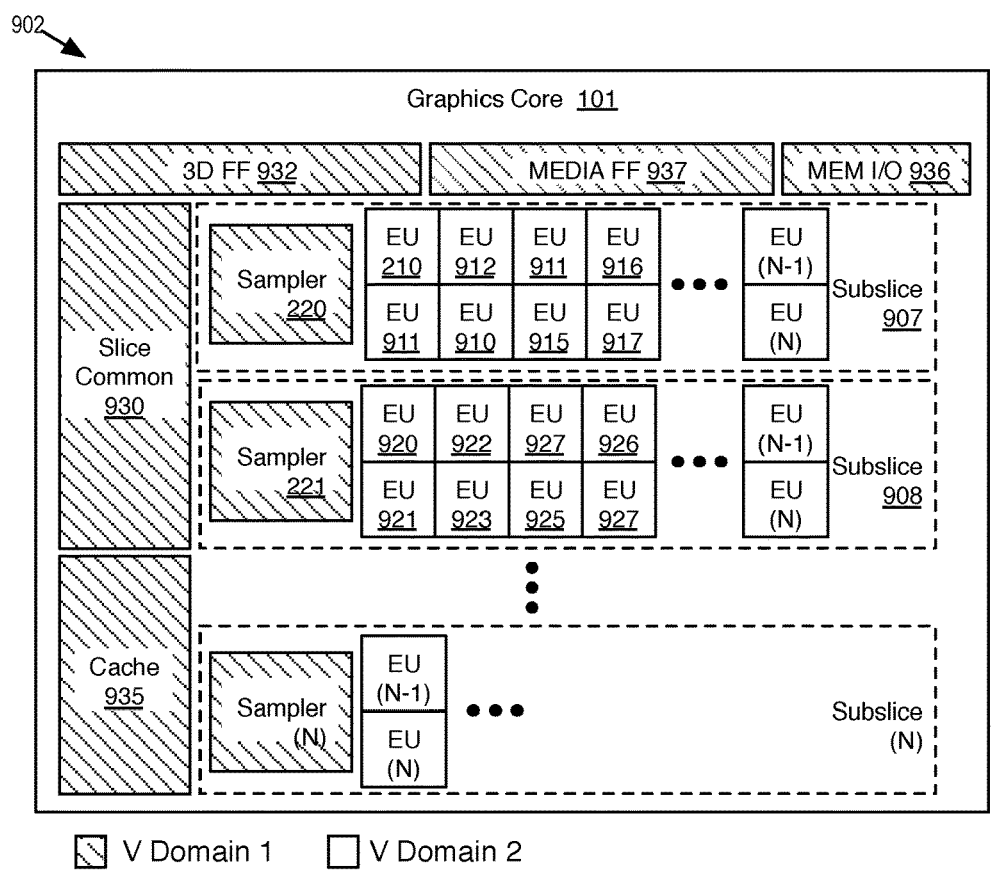
Figure 9C:
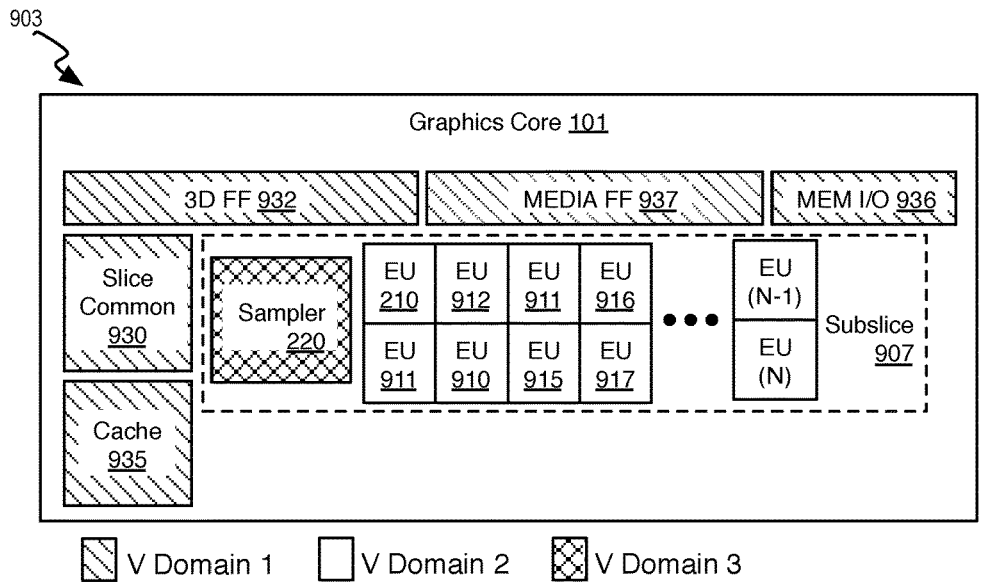
Figure 9D:
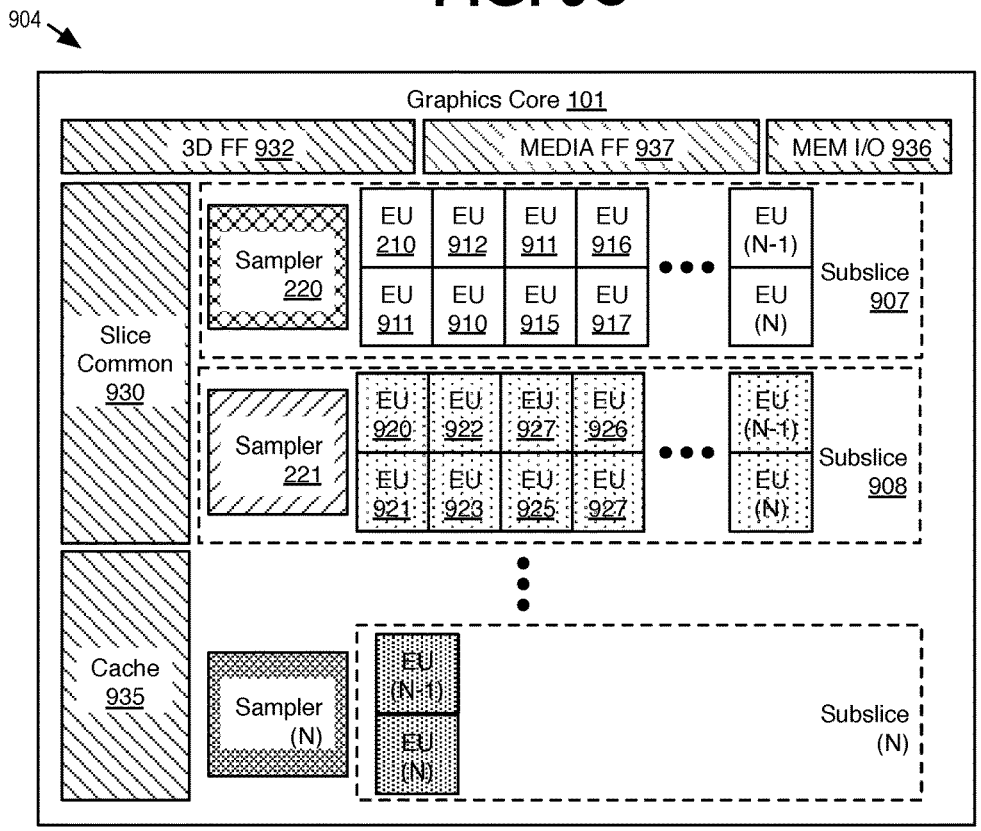

In further embodiments, the architecture with two voltage-regulated sub-domains may be maintained across additional subslices. For the architecture 902 shown in FIG. 9B, multiple subslices 907, 908, etc. are provided for each slice common 930. Cache 935 (e.g., a L3 cache) is also common to the plurality of subslices 907, 908. With this architecture, all EUs 210, 911-917 and 920-927 are grouped within one voltage regulated sub-domain while all non-EU logic units are managed in another voltage regulated sub-domain. FIG. 9C illustrates an alternative voltage-regulated sub-domain architecture 903 in which all logic units outside of subslice 907 are in a voltage sub-domain, sampler 220 is in another voltage sub-domain, and EUs 210, 911-917 are in another sub-domain. The three sub-domain architecture may then be maintained across additional subslices, or two additional domains may be added for each additional subslice, as for the architecture 904 illustrated in FIG. 9D.

Figure 10:
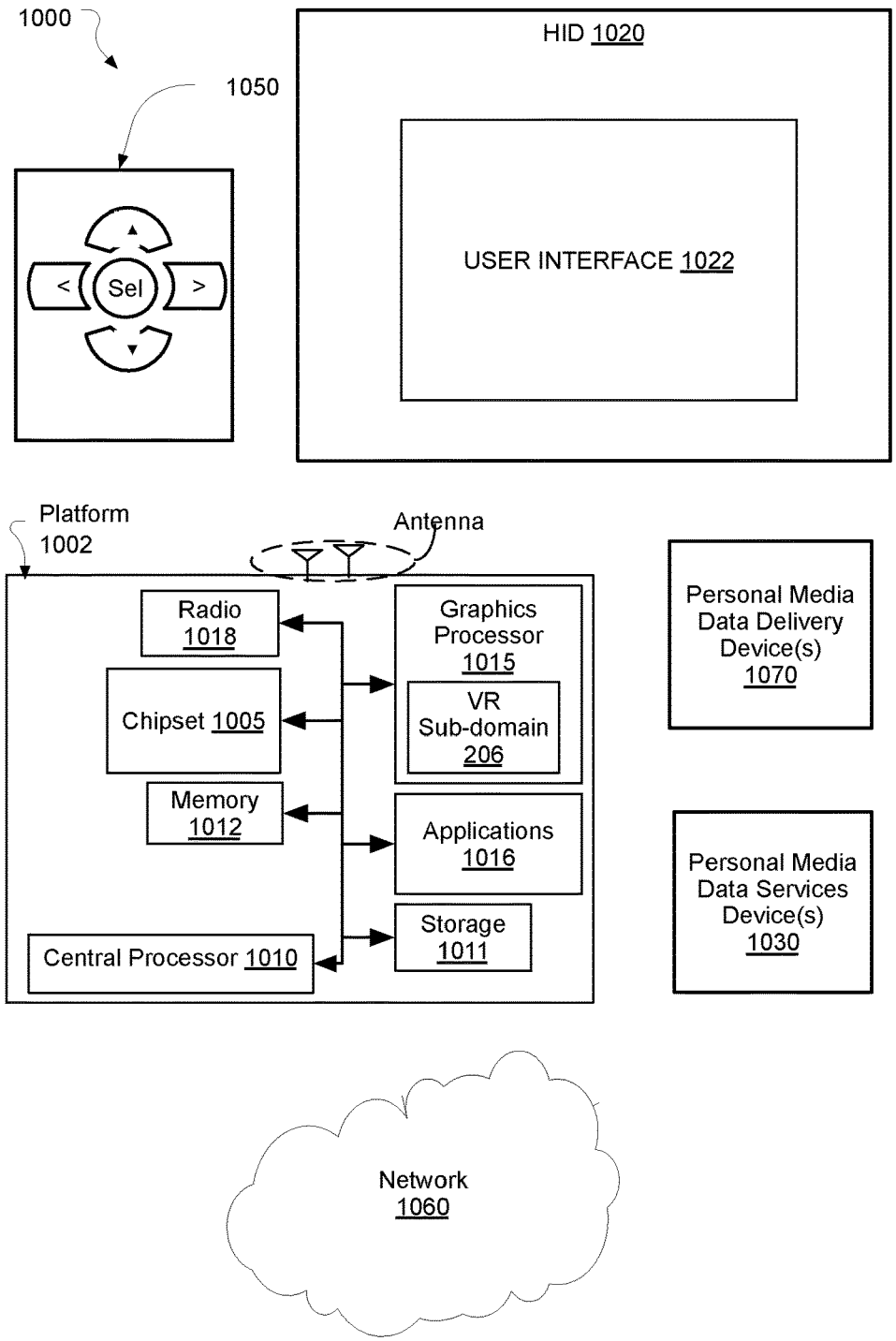
FIG. 10 is an illustrative diagram of an exemplary system, in accordance with an embodiment.

FIG. 10 is an illustrative diagram of an exemplary system 1000, in accordance with embodiments. System 1000 may implement all or a subset of the various functional blocks depicted in FIG. 2B, or FIGS. 9A-5D. For example, in one embodiment a graphics processor 1015 includes the voltage-regulated sub-domain 206 described elsewhere herein. System 1000 may be a mobile device although system 1000 is not limited to this context. For example, system 1000 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 1000 may also be an infrastructure device. For example, system 1000 may be incorporated into a large format television, set-top box, desktop computer, or other home or commercial network device.

In various implementations, system 1000 includes a platform 1002 coupled to a HID 1020. Platform 1002 may receive captured personal media data from a personal media data services device(s) 1030, a personal media data delivery device(s) 1040, or other similar content source. A navigation controller 1050 including one or more navigation features may be used to interact with, for example, platform 1002 and/or HID 1020. Each of these components is described in greater detail below.

In various implementations, platform 1002 may include any combination of a chipset 1005, processor 1010, memory 1012, storage 1014, graphics processor 1015, applications 1016 and/or radio 1018. Chipset 1005 may provide intercommunication among processor 1010, memory 1012, storage 1014, graphics processor 1015, applications 1016, or radio 1018. For example, chipset 1005 may include a storage adapter (not depicted) capable of providing intercommunication with storage 1014.

Processor 1010 may be implemented as one or more Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be a multi-core processor(s), multi-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics processor 1015 may perform processing of images such as still or video media data for display, or perform general computing functions in a highly parallel manner. Graphics processor 1015 may include one or more GPU, or visual processing unit (VPU), for example. An analog or digital interface may be used to communicatively couple graphics processor 1015 and display 1020. For example, the interface may be any of a High-Definition Multimedia Interface, Display Port, wireless HDMI, and/or wireless HD compliant techniques. Graphics processor 1015 may be integrated with central processor 1010 onto a single chip (i.e., SoC) as a graphics core or provided as part of chipset 1005. In some implementations, graphics processor 1015 may be a stand-alone card communicatively coupled to chipset 1005. In various exemplary embodiments, graphics processor 1015 and/or central processor 1010 invokes or otherwise implements processes and/or processor power management methods utilizing voltage-regulated core sub-domains, for example as described elsewhere herein.

The sub-domain voltage-regulation and processor power management techniques described herein may be implemented in various hardware architectures, cell designs, or "IP cores." As still another embodiment, the methods and functions described herein in the context of graphics processor may be extended to a general-purpose processor, including a multi-core processor. In further embodiments, the methods and functions may be implemented in a purpose-built consumer electronics device, such as a game console processor.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, HID 1020 may include any television type monitor or display. HID 1020 may include, for example, a computer display screen, touch screen display, video monitor, television-like device, and/or a television. HID 1020 may be digital and/or analog. In various implementations, HID 1020 may be a holographic display. Also, HID 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on HID 1020.

In various implementations, personal media services device(s) 1030 may be hosted by any national, international and/or independent service and thus accessible to platform 1002 via the Internet, for example. Personal media services device(s) 1030 may be coupled to platform 1002 and/or to display 1020. Platform 1002 and/or personal services device(s) 1030 may be coupled to a network 1060 to communicate (e.g., send and/or receive) media information to and from network 1060. Personal media delivery device(s) 1040 also may be coupled to platform 1002 and/or to HID 1020.

In various implementations, personal media data services device(s) 1030 may include a cable television box, personal computer, network, telephone, Internet enabled devices or appliance capable of delivering digital information and/or content, and any other similar device capable of unidirectionally or bidirectionally communicating content between a media data provider and platform 1002, via network 1060 or directly. It will be appreciated that the content may be communicated unidirectionally and/or bidirectionally to and from any one of the components in system 1000 and a provider via network 1060. Examples of personal media include any captured media information including, for example, video, music, medical and gaming information, and so forth.

Personal media data services device(s) 1030 may receive content including media information with examples of content providers including any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., HID 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In embodiments, controller 1050 may not be a separate component but may be integrated into platform 1002 and/or HID 1020. The present disclosure, however, is not limited to the elements or in the context shown or described herein.

In various implementations, program logic may allow platform 1002 to stream content to media adaptors or other personal media services device(s) 1030 or personal media delivery device(s) 1040 even when the platform is turned "off" In addition, chipset 1005 may include hardware and/or software support for 8.1 surround sound audio and/or high definition (7.1) surround sound audio, for example. Drivers may include a graphics driver for integrated graphics platforms.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 11:
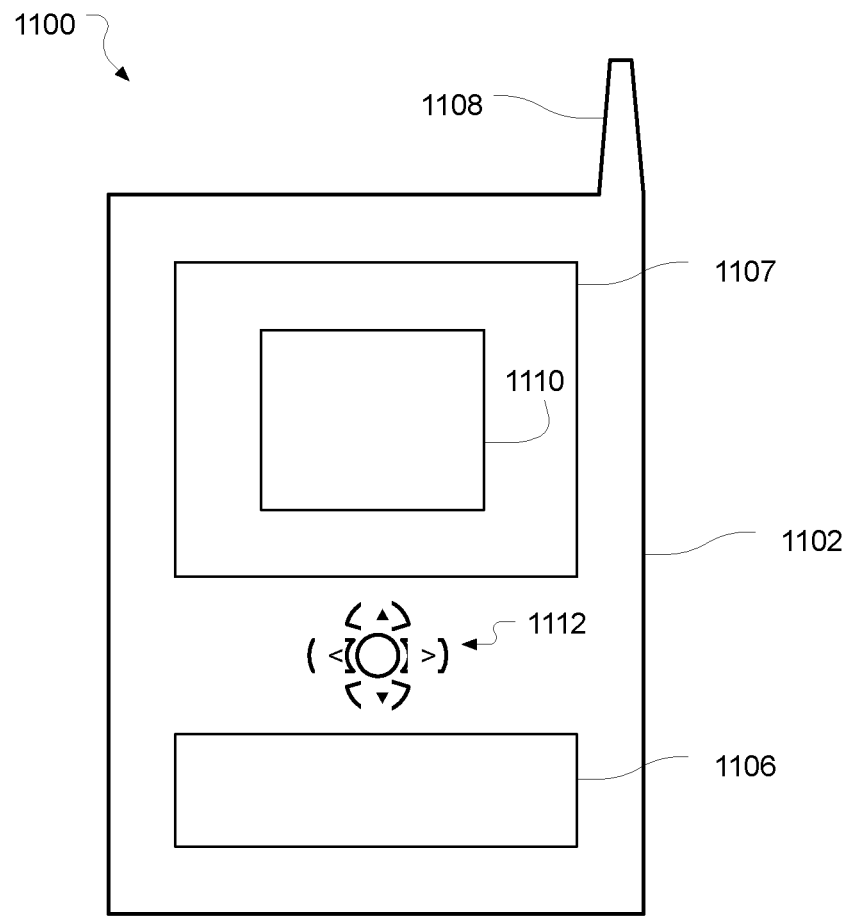
FIG. 11 is an illustrative diagram of an exemplary system, arranged in accordance with an embodiment.

As described above, system 1000 may be embodied in varying physical styles or form factors. FIG. 11 illustrates embodiments of a small form factor device 1100 in which system 1000 may be embodied. In embodiments, for example, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth.

Examples of a mobile computing device also may include computers configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable display unit for displaying information appropriate for a mobile computing device. I/O device 1206 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown), or may be digitized by a voice recognition device. Embodiments are not limited in this context.

Various embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following examples pertain to particular exemplary embodiments.

In one or more first embodiment, a first voltage domain coupled to a power supply rail operable at a domain voltage. A first voltage sub-domain of the first voltage domain coupled to the power supply rail through a first supply branch, the first voltage sub-domain including at least one or more texture sampler. A second voltage sub-domain of the first voltage domain coupled to the power supply rail through a second supply branch, the second voltage sub-domain including at least one or more execution unit (EU). At least one of the first and second supply branches is operable to convert the domain voltage down to a sub-domain voltage that maintains the sampler or EU in an active, low power state.

In furtherance of the one or more first embodiment, the first supply branch further comprises a voltage regulator operable to provide to the first voltage sub-domain a first sub-domain voltage that is lower than a second sub-domain voltage provided to the second voltage sub-domain.

In furtherance of the one or more first embodiment, the first supply branch further comprises a first voltage regulator operable to provide the first sub-domain voltage. The second supply branch further comprises a second voltage regulator operable to provide to the second voltage sub-domain a second sub-domain voltage lower than the domain voltage, and sufficient to maintain the EU in an active state.

In furtherance of the one or more first embodiment, the domain voltage is modifiable between a high voltage and a low voltage. The first supply branch further comprises a voltage regulator operable to convert the high voltage down to the low voltage and to output the low voltage to the first sub-domain. The domain voltage is modifiable at a first rate between a high voltage and a low voltage. The first supply branch further comprises a voltage regulator operable to provide the first sub-domain voltage to the first voltage sub-domain. The voltage regulator is further operable to vary the first sub-domain voltage between the high voltage and the low voltage at a second rate that is greater than the first rate.

In furtherance of the one or more first embodiment, at least the second supply branch comprises a plurality of power transistors operable in a voltage regulation mode to convert the domain voltage to the reduced sub-domain voltage, and further operable in a power gating mode to deactivate at least one of the EU.

In furtherance of the one or more first embodiment, the system includes a sub-domain voltage controller, and a voltage regulator comprising a digital low-dropout (DLDO) regulator coupled to the sub-domain voltage controller.

In furtherance of the one or more first embodiment, the system includes a sub-domain voltage controller, and a voltage regulator comprising a digital low-dropout (DLDO) regulator coupled to the sub-domain voltage controller. The DLDO regulator further comprises a voltage sensor, a switch array including a plurality of power transistors coupled in parallel across the power supply rail and an output of the DLDO and a digital switch controller having outputs coupled to gates of the power transistors to vary the number of transistors enabled in the switch array as a function of an output of the sub-domain voltage controller and an output of the DLDO that is coupled to the voltage sensor.

In furtherance of the one or more first embodiment, the system includes a sub-domain voltage controller responsive to a performance parameter associated with at least one of the first and second sub-domain, and includes a voltage regulator comprising a digital low-dropout (DLDO) regulator coupled to the sub-domain voltage controller. The DLDO regulator further comprises a switch array including a plurality of power transistors coupled in parallel across the power supply rail and an output of the DLDO, a comparator to compare an output of the sub-domain voltage controller and the output of the DLDO, and a digital controller coupled to gates of the transistors to vary the number of transistors enabled in the switch array based on an output of the comparator.

In furtherance of the one or more first embodiment, the first voltage sub-domain includes at least the sampler, a rasterizer, and a memory interface. The second voltage sub-domain includes a plurality of EUs and is exclusive of the sampler, the rasterizer, and the memory interface.

In one or more second embodiment, a processing system includes a central processor core, a graphics processor core, a first voltage regulator to provide power supply rails to both the central processor core and graphics processor core. The graphics processor core further includes a first voltage domain coupled to receive a domain voltage from one or more of the power supply rails. The graphics processor core further includes a first voltage sub-domain coupled to the one or more power supply rails through a first supply branch, the first voltage sub-domain including at least a texture sampler. The graphics processor core further includes a second voltage sub-domain coupled to the one or more power supply rails through a second supply branch, the second voltage sub-domain including at least an execution unit (EU). At least one of the first and second supply branches includes a second voltage regulator operable to reduce the domain voltage to a sub-domain voltage that maintains the sampler or EU in an active, low power state.

In furtherance of the one ore more second embodiment, the first supply branch further comprises the second voltage regulator operable to provide the first sub-domain voltage. The second supply branch further comprises a third voltage regulator operable to provide to the second voltage sub-domain a second sub-domain voltage that is lower than the domain voltage, and maintains the EU in an active state.

In furtherance of the one ore more second embodiment, the first voltage sub-domain includes at least the sampler, a rasterizer, and a memory interface. The second voltage sub-domain includes a plurality of EUs and is exclusive of the sampler, rasterizer, and the memory interface. Each of the second and third voltage regulators comprises a digital low-dropout (DLDO) regulator. In furtherance of the one ore more second embodiment, each DLDO regulator further includes a voltage sensor, a switch array including a plurality of power transistors coupled in parallel across the power supply rail and an output of the DLDO, and a digital switch controller having outputs coupled to gates of the transistors to vary the number of transistors enabled in the switch array from zero to power gate a sub-domain to more than zero to voltage regulate a sub-domain as a function of the output of the DLDO coupled to the voltage sensor and a control signal indicative of a target sub-domain voltage.

In one or more third embodiments, a method of managing performance of a graphics processor core includes supplying a domain voltage over a power supply rail coupled to a voltage domain including one or more sampler and one or more execution unit (EU). The method further includes monitoring performance demand on the graphics processor core. The method further includes regulating a first sub-domain voltage supplied from the rail and provided to the one or more sampler, based on the monitoring, to below the domain voltage independently of a second sub-domain voltage supplied from the rail and provided to the one or more EU.

In furtherance of the one or more third embodiment, the method includes operating the EU at a second sub-domain voltage that is equal to the domain voltage while operating the sampler at the first sub-domain voltage. The method further includes regulating the second sub-domain voltage to below the domain voltage. The method further includes operating the EU at the reduced second sub-domain voltage.

In furtherance of the one or more third embodiment, the method includes cycling at least the second sub-domain voltage between the domain voltage and a voltage below the domain voltage to modulate the performance of the at least one EU independently from the at least one sampler.

In furtherance of the one or more third embodiment, the method includes increasing the domain voltage from a low voltage to a high voltage at a first rate before regulating the second sub-domain voltage down from the high voltage to the low voltage at a second rate greater than the first rate.

In furtherance of the one or more third embodiment, the method includes controlling a plurality of power transistors in a voltage regulation mode to regulate the domain voltage down to the second sub-domain voltage during a first-time period; and In furtherance of the one or more third embodiment, the method includes controlling one or more of the plurality of transistors in a power gating mode to deactivate at least one of the EU.

In furtherance of the one or more third embodiment, regulating a first sub-domain voltage further includes receiving a sub-domain voltage control signal, performing a comparison of the sub-domain voltage control signal with the first sub-domain voltage, and driving a digital controller coupled to gates of the transistors to vary, based on the comparison, a number of enabled power transistors coupled in parallel across the power supply rail and an output rail coupled to the first sub-domain.

In one or more fourth embodiment, at least one machine-readable storage medium including machine-readable instructions, that in response to being executed on a computing device, cause the computing device to manage performance of a graphics processor core by: monitoring performance demand on the graphics processor core; and based on the monitoring, regulating a first sub-domain voltage supplied to one or more sampler by a power supply rail coupled to a voltage domain including the sampler and one or more execution unit (EU) to below the domain voltage independently of a second sub-domain voltage supplied to the one or more EU.

In furtherance of the one or more fourth embodiment, the machine-readable instructions further includes instructions that in response to being executed on the computing device, cause the computing device to manage performance of a graphics processor core by: operating the EU at a second sub-domain voltage that is equal to the domain voltage while operating the sampler at the first sub-domain voltage; regulating the second sub-domain voltage to below the domain voltage; and operating the EU at the reduced second sub-domain voltage.

In one or more fifth embodiment, a machine-readable storage medium including machine-readable instructions, when executed, implement a method or realize an apparatus as described in any preceding embodiment.

In one or more sixth embodiment, an apparatus includes means to perform the method as in any of the one or more third embodiment.

In one or more seventh embodiment, a graphics processor core, includes a means for supplying a domain voltage over a power supply rail coupled to a voltage domain including one or more sampler and one or more execution unit (EU). The core further includes a means for monitoring performance demand on the graphics processor core. The core further includes a means for regulating a first sub-domain voltage supplied from the rail and provided to the one or more sampler, based on an output from the monitoring means, to below the domain voltage independently of a second sub-domain voltage supplied from the rail and provided to the one or more EU.

In furtherance of the one or more seventh embodiment, the graphics processor core further includes a means for cycling at least the second sub-domain voltage between the domain voltage and a voltage below the domain voltage to modulate the performance of the at least one EU independently from the at least one sampler.

In furtherance of the one or more seventh embodiment, the means for supplying the domain voltage further comprises a means for increasing the domain voltage from a low voltage to a high voltage at a first rate before regulating the second sub-domain voltage down from the high voltage to the low voltage at a second rate greater than the first rate.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A system on a chip (SOC), comprising:
   an input to receive an input voltage from a source external to the SOC, wherein the input voltage is adjustable to a non-zero input voltage below 1V; and
   a power domain including first sub-domain circuitry coupled to the input voltage through a first switch, and second sub-domain circuitry coupled to the input voltage through a second switch, wherein:
      the first switch is to connect the first sub-domain circuitry with the input voltage in a first mode, isolate the first sub-domain circuitry from the input voltage in a second mode, and, in a third mode, reduce the input voltage down to a non-zero voltage that is output to the first sub-domain circuitry;
      the second switch is to connect the second sub-domain circuitry with the input in the first mode, isolate the second sub-domain circuitry from the input in the second mode, and, in the third mode, reduce the input voltage down to a non-zero voltage that is output to the second sub-domain circuitry; and
      the input voltage received is to vary at a first rate and the first switch is to change the input voltage at a second rate, faster than the first rate.

2. The SOC of claim 1, wherein the input voltage is adjustable within a range comprising at least 0.6V and 0.9V, and wherein the first sub-domain circuitry is operable in a low power mode at the non-zero voltage.

3. The SOC of claim 1, wherein the power domain is a first power domain, and the SOC further comprises:
a second power domain including third sub-domain circuitry coupled to the input through a third switch, and fourth sub-domain circuitry coupled to the input through a fourth switch, wherein:
the third switch, separate from the first and second switch, is to connect the third sub-domain circuitry with the input voltage in the first mode, and isolate the third sub-domain circuitry from the input voltage in the second mode, and output to the third sub-domain circuitry the non-zero voltage below the input voltage in the third mode; and
the fourth switch, separate from the first and second switch, is to connect the fourth sub-domain circuitry with the input in the first mode, isolate the fourth sub-domain circuitry from the input in the second mode, and output to the fourth sub-domain circuitry the non-zero voltage below the input voltage in a third mode.

4. The SOC of claim 1, wherein the first switch comprises one or more transistors, wherein the first sub-domain circuitry is to connect with the input through a channel of the transistors in the first mode, wherein the transistors are to isolate the first sub-domain circuitry from the input in the second mode, and wherein the transistors are to output to the first sub-domain circuitry the non-zero voltage in the third mode.

5. The SOC of claim 1, wherein the non-zero voltage is no more than 0.6V.

6. The SOC of claim 1, wherein the input voltage received is to vary between a first non-zero input voltage and a second non-zero input voltage.

7. The SOC of claim 1, wherein the SOC comprises one or more graphics cores and one or more central processor cores.

8. A platform, comprising:
a voltage regulator to provide an input voltage that is adjustable between a first non-zero input voltage and a second non-zero input voltage, at least one of which is below 1V; and
a system on a chip (SOC) coupled to the voltage regulator, wherein the SOC comprises:
an input to receive the input voltage from the voltage regulator; and
a power domain including first sub-domain circuitry coupled to the input through a first switch, and second sub-domain circuitry coupled to the input through a second switch, wherein:
the first switch is to connect the first sub-domain circuitry with the input in a first mode, isolate the first sub-domain circuitry from the input in a second mode, and, in a third mode, reduce the input voltage down to a non-zero voltage that is output to the first sub-domain circuitry;
the second switch, separate from the first switch, is to connect the second sub-domain circuitry with the input in the first mode, isolate the second sub-domain circuitry from the input in the second mode, and, in a third mode, reduce the input voltage down to a non-zero voltage that is output to the second sub-domain circuitry; and
the input voltage received is to vary at a first rate and the first switch is to change the input voltage at a second rate, faster than the first rate.

9. The platform of claim 8, wherein the first non-zero input voltage is no more than 0.6V and the second non-zero input voltage is at least 0.9V.

10. The platform of claim 8, wherein the first sub-domain circuitry is operable in a low power mode at the non-zero voltage.

11. The platform of claim 8, wherein the power domain is a first power domain, and the SOC further comprises:
a second power domain including third sub-domain circuitry coupled to the input through a third switch, and fourth sub-domain circuitry coupled to the input through a fourth switch, wherein:
the third switch, separate from the first and second switch, is to connect the third sub-domain circuitry with the input voltage in the first mode, and isolate the third sub-domain circuitry from the input voltage in the second mode, and output to the third sub-domain circuitry the non-zero voltage below the input voltage in the third mode; and
the fourth switch, separate from the first and second switch, is to connect the fourth sub-domain circuitry with the input in the first mode, isolate the fourth sub-domain circuitry from the input in the second mode, and output to the fourth sub-domain circuitry the non-zero voltage below the input voltage in a third mode.

12. The platform of claim 8, wherein the first switch comprises one or more transistors, wherein the first sub-domain circuitry is to connect with the input through a channel of the transistors in the first mode, wherein the transistors are to isolate the first sub-domain circuitry from the input in the second mode, and wherein the transistors are to output to the first sub-domain circuitry the non-zero voltage in the third mode.

13. The platform of claim 8, wherein:
the first non-zero input voltage and a second non-zero input voltage differ by at least 0.3V; and
the non-zero voltage is no more than 0.6V.

14. A method of operating a system on a chip (SOC), the method comprising:
receiving an input voltage from a source external to the SOC, wherein the input voltage is adjustable to a non-zero voltage below 1V;
connecting, through a first switch, first sub-domain circuitry of a power domain to the input voltage in a first mode;
isolating, with the first switch, the first sub-domain circuitry from the input voltage in a second mode; and,
reducing, with the first switch, the input voltage down to a non-zero voltage output to the first sub-domain circuitry;
connecting, through a second switch, second sub-domain circuitry of the power domain to the input voltage in the first mode;
isolating, with the second switch, the second sub-domain circuitry from the input voltage in the second mode; and
reducing, with the second switch, the input voltage down to a non-zero voltage output to the second sub-domain circuitry, wherein the input voltage received varies at a first rate and the first switch is to change the input voltage at a second rate, faster than the first rate.

15. The method of claim 14, further comprising operating the first and second sub-domain circuitry in a low power mode at the non-zero voltage.

16. The method of claim 15, wherein the non-zero voltage is no more than 0.6V.

17. The method of claim 14, wherein the first switch comprises one or more transistors, wherein the first sub-domain circuitry is to connect with the input through a channel of the transistors in the first mode, wherein the transistors are to isolate the first sub-domain circuitry from the input in the second mode, and wherein the transistors are to output to the first sub-domain circuitry the non-zero voltage in the third mode.

18. The method of claim 14, wherein the input voltage received varies between a first non-zero input voltage and a second non-zero input voltage that differ by at least 0.3V.

* * * * *